United States Patent
Tatunashvili et al.

(10) Patent No.: US 12,111,755 B2
(45) Date of Patent: *Oct. 8, 2024

(54) GENERATING TEST DATA FOR APPLICATION PERFORMANCE

(71) Applicant: International Business Machines Corporation, Armonk, NY (US)

(72) Inventors: Anna Tatunashvili, Bratislava (SK); Rupam Bhattacharjee, Karimganj (IN); Siba Prasad Satapathy, Bangalore (IN); George Thayyil Jacob Sushil, Bangalore (IN); Jozef Fekiač, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/649,535

(22) Filed: Jan. 31, 2022

(65) Prior Publication Data

US 2023/0244596 A1 Aug. 3, 2023
US 2024/0104009 A9 Mar. 28, 2024

Related U.S. Application Data

(63) Continuation of application No. 17/026,478, filed on Sep. 21, 2020, now Pat. No. 11,237,951.

(51) Int. Cl.
*G06F 11/36* (2006.01)
*G06F 11/34* (2006.01)

(52) U.S. Cl.
CPC ...... *G06F 11/3692* (2013.01); *G06F 11/3414* (2013.01); *G06F 11/3684* (2013.01); *G06F 11/3688* (2013.01)

(58) Field of Classification Search
CPC ............. G06F 11/3684; G06F 11/3688; G06F 11/3692
(Continued)

(56) References Cited

U.S. PATENT DOCUMENTS 6,961,925 B2 11/2005 Callahan, II
10,339,038 B1 * 7/2019 Singh ................. G06F 11/3688
(Continued)

FOREIGN PATENT DOCUMENTS

WO 2016133855 A1 8/2016

OTHER PUBLICATIONS

"Apache Spark Architecture Explained in Detail", Jun. 7, 2020, 3 pages, <https://www.dezyre.com/article/apache-spark-architecture-explained-in-data-partitioning-in-spark-helps-achieve-more-parallelism/297>.
(Continued)

*Primary Examiner* — Geoffrey R St Leger
(74) *Attorney, Agent, or Firm* — Joseph P. Curcuru

(57) ABSTRACT

In an approach to improve the extraction of test datasets for testing and resource optimization, embodiments execute a test run on a full dataset of a job, and identify existing bottlenecks in the job through a run-time monitoring interface. Additionally, embodiments execute a run-time metrics analysis, a source code analysis, and a source data impact analysis of a distributed data processing engine executing a distributed data processing job, and generate, by an analysis and impact scoring engine, an impact scoring table of job transformations based on the source code analysis. Furthermore, embodiments generate data extraction rules based on the impact scoring table, and extract a test dataset based on the data extraction rules. Moreover, embodiments evaluate the data extraction rules against user defined thresholds, and prepare a representative test dataset, and output, through a
(Continued)

user interface on a computing device, the representative test dataset to a user.

20 Claims, 6 Drawing Sheets

(58) Field of Classification Search
USPC .......................................................... 717/124
See application file for complete search history.

(56) References Cited

U.S. PATENT DOCUMENTS

| | | | |
|---|---|---|---|
| 10,467,220 B2 | 11/2019 | Li | |
| 10,474,559 B2 | 11/2019 | Moorthi | |
| 2004/0194054 A1* | 9/2004 | McGrath | G06F 11/3672 717/100 |
| 2009/0199160 A1* | 8/2009 | Vaitheeswaran | G06F 11/3688 717/124 |
| 2011/0029817 A1 | 2/2011 | Nakagawa | |
| 2014/0067790 A1* | 3/2014 | Lipin | G06F 16/284 707/E17.005 |
| 2016/0026553 A1 | 1/2016 | Piela | |
| 2017/0046217 A1 | 2/2017 | Shinde | |

OTHER PUBLICATIONS

"Chapter 2 Automated Software Test Data Generation: Direction of Research", printed on Jun. 29, 2020, 40 pages.

"Configuration—Spark 3.0.0 Documentation", printed on Jun. 26, 2020, 43 pages, <https://spark.apache.org/docs/latest/configuration.html>.

"How are stages split into tasks in Spark?", Stack Overflow, printed on Jun. 26, 2020, <https://stackoverflow.com/questions/37528047/how-are-stages-split-into-tasks-in-spark>.

"How Data Partitioning in Spark helps achieve more parallelism?", Last Updated: Jun. 17, 2020, printed on Jun. 26, 2020, 3 pages, <https://www.dezyre.com/article/how-data-partitioning-in-spark-helps-achieve-more-parallelism/297>.

"RDD Programming Guide—Spark 3.0.0 Documentation", printed on Jun. 26, 2020, 14 pages, <http://spark.apache.org/docs/latest/rdd-programming-guide.html>.

Amannejad et al., "Fast and Lightweight Execution Time Predictions for Spark Applications", 2019 IEEE 12th International Conference on Cloud Computing (CLOUD), @2019 IEEE, 3 pages.

Disclosed Anonymously et al., "Method and system to dynamically generate and execute performance test cases starting from a code static analysis", An IP.com Prior Art Database Technical Disclosure, IP.com No. IPCOM000234144D, IP.com Electronic Publication Date: Jan. 14, 2014, 4 pages.

Manivannan, Rathnadevi, "Apache Spark on YARN—Performance and Bottlenecks", Jun. 27, 2017, 3 pages, <https://dzone.com/articles/apache-spark-on-yarn-performance-and-bottlenecks>.

Mell et al., "The NIST Definition of Cloud Computing", NIST, National Institute of Standards and Technology, Special Publication 800-145, Sep. 2011, 7 pages.

Mustafa et al., "A Machine Learning Approach for Predicting Execution Time of Spark Jobs", Computer and Systems Engineering, Alexandria University, Alexandria, Egypt, Elsevier, Available online Nov. 22, 2018, 12 pages.

Raza, Ali, "Test Data Extraction and Comparison With Test Data Generation", A thesis submitted in partial fulfillment of the requirements for the degree of Master of Science in Computer Science, Utah State University, Logan, Utah, 2011, 123 pages.

Rowen et al., "apache / spark", Sep. 30, 2019, 3 pages, <https://github.com/apache/spark/tree/e1ea806b3075d279b5f08a29fe4c1ad6d3c4191a/core/src/main/scala/org/apache/spark>.

Tatunashvili, et al., "Generating Test Data for Application Performance", U.S. Appl. No. 17/026,478, filed Sep. 21, 2020.

Vaidya, Neha, "Apache Spark Architecture—Sprk Cluster Architecture Explained", May 22, 2019, 4 pages, <https://www.edureka.co/blog/spark-architecture/>.

Veejayendraa, "Understanding Spark Partitioning", Dec. 19, 2015, 7 pages, <https://techmagie.wordpress.com/2015/12/19/understanding-spark-partitioning/>.

Wikipedia, "Functional dependency", This page was last edited on Jun. 22, 2020, 6 pages, <https://en.wikipedia.org/wiki/Functional_dependency>.

Wikipedia, "Set theory", This page was last edited on Apr. 30, 2020, 8 pages, <https://en.wikipedia.org/wiki/Set_theory>.

IBM: List of IBM Patents or Patent Applications Treated as Related. Filed Herewith. 2 pages.

Tahbildar, "Investigations On Automated Test Data Generation Techniques with special reference to Loops and Infeasible Paths", A Thesis submitted in fulfillment of the requirement for the Degree of Doctor of Philosophy in Engineering (Computer Science and Application) Faculty of Engineering, Gauhati University, India, Relevant Section: Chapter 2, Dec. 14, 2012, 175 pages.

* cited by examiner

GENERATING TEST DATA FOR APPLICATION PERFORMANCE

BACKGROUND OF THE INVENTION

The present invention relates generally to the field of big data datasets, and more particularly to extracting test datasets that are representative of performance.

Big data is a field that identifies ways to analyze, systematically extract information from, or otherwise deal with data sets that are too large or complex to be processed by traditional data-processing application software. Data with many cases (rows) offer greater statistical power, while data with higher complexity (more attributes or columns) may lead to a higher false discovery rate. Big data challenges include capturing data, data storage, data analysis, search, sharing, transfer, visualization, querying, updating, information privacy and data source. Big data was originally associated with three key concepts: volume, variety, and velocity. Big data often includes data with sizes that exceed the capacity of traditional software to process within a reasonable time and value.

Current usage of the term big data tends to refer to the use of predictive analytics, user behavior analytics, or certain other advanced data analytics methods that extract value from data, and seldom to a particular size of data set. Scientists, business executives, practitioners of medicine, and advertising firms alike regularly meet difficulties with large datasets in areas including Internet searches, fintech, and business informatics. Scientists encounter limitations in e-Science work, including meteorology, genomics, connectomics, complex physics simulations, biology and environmental research. Data sets grow rapidly, to a certain extent because they are increasingly gathered by cheap and numerous information-sensing Internet of things (IoT) devices such as mobile devices, remote sensing, software logs, cameras, microphones, radio-frequency identification (RFID) readers, and wireless sensor networks.

SUMMARY

Embodiments of the present invention disclose a method, a computer program product, and a system for extracting test datasets for testing and resource optimization, the method comprising: executing a test run on a full dataset of a job; identifying existing bottlenecks in the job through a run-time monitoring interface; executing, by an automated analysis tool, a run-time metrics analysis, a source code analysis, and a source data impact analysis of a distributed data processing engine executing a distributed data processing job; generating, by an analysis and impact scoring engine, an impact scoring table of job transformations based on the source code analysis; generating data extraction rules based on the impact scoring table; extracting a test dataset based on the data extraction rules; evaluating the data extraction rules against user defined thresholds, and preparing a representative test dataset; and outputting, via a user interface on a computing device, the representative test dataset to a user.

DETAILED DESCRIPTION

Figure 1:
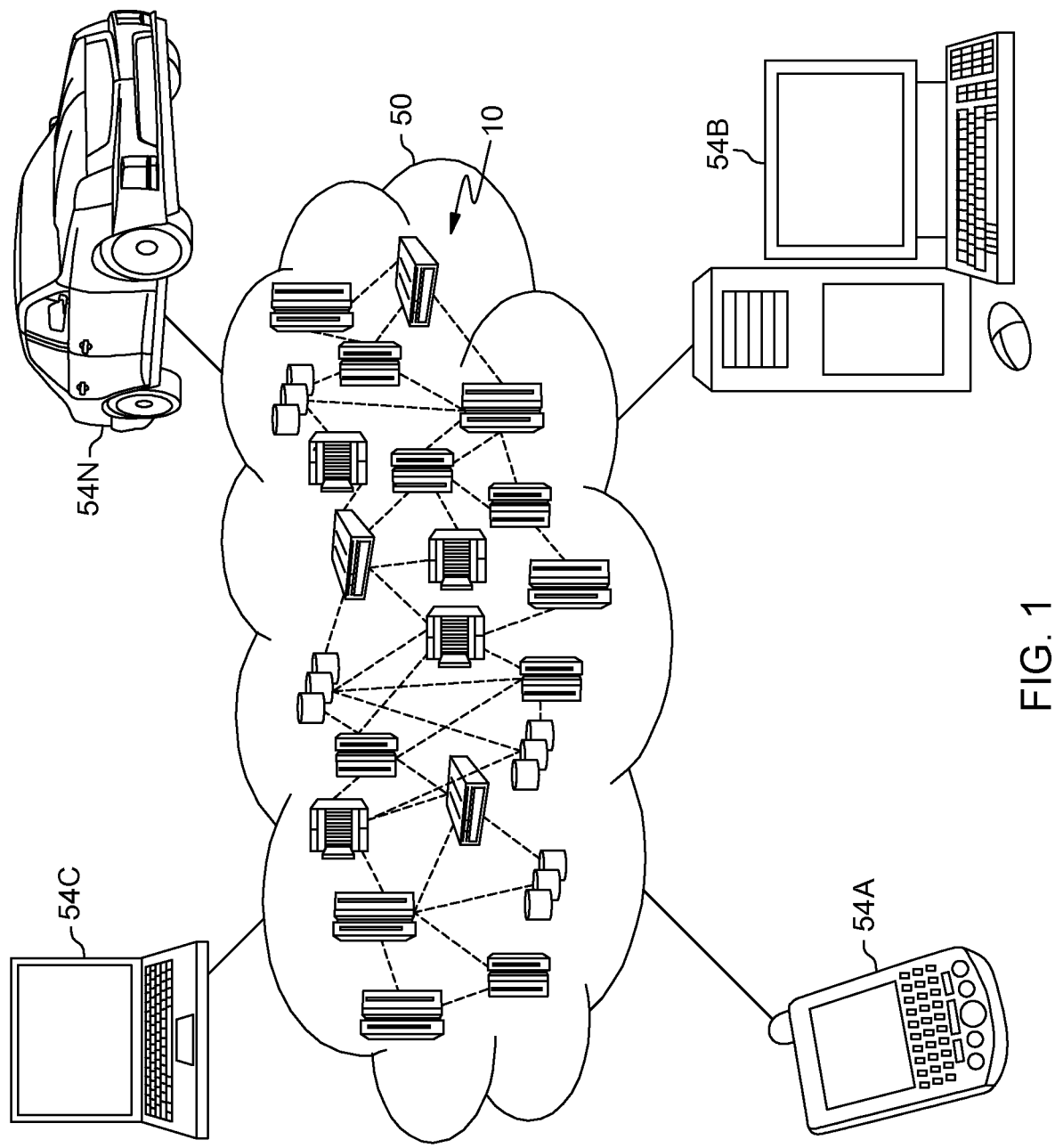
FIG. 1 depicts a cloud computing environment according to an embodiment of the present invention.

Embodiments of the present invention recognize that the exponential growth of digital data generated by companies causes a continuous increase in demand for effective ways of processing big data (e.g., managing, parsing, analyzing, disrupting, and/or interpreting). Additionally, embodiments of the present invention recognize that numerous tests and validations that are required both during initial development and new releases may increase the deployment cycle due to long processing times required when working with big data. Embodiments of the present invention recognize that working with time consuming applications, makes it difficult to iterate through changes in code and runtime parameters.

Embodiments of the present invention recognize that running numerous tests on big data datasets through Extract, Transfer, Load (ETL) and Structured Query Language (SQL) batch jobs (i.e., distributed data processing jobs) across large data sets, processing of streaming data from sensors, internet of things (IoT), or financial systems, and machine learning tasks can take hours if not days. In this context, testing any change (e.g., code, runtime parameter, etc.) involves extensive use of computational resources and time. Embodiments of the present invention recognize that prolonged development cycle due to developer's idle time as well as additional resource high load periods (especially in cases such as everything as a service (XaaS) or Cloud environments) incur extra costs on projects and create bottlenecks in the cycle from an agile perspective.

Embodiments of the present invention recognize that the use of randomly generated test datasets may not provide results that correlate with end product performance and resource consumption. This issue raises the demand for an automated approach to model and extract test datasets for various testing purposes. Embodiments of the present invention recognize that users want to utilize an automated tool for generating small datasets from larger datasets, that correlate to performance with source data for a given job (i.e., distributed data processing job) that comprises minimal inputs from the user, to be used for testing and resource optimization tasks.

Embodiments of the present invention recognize that a number of tools for test data generation already exist; however, the current tools contain at least one of the four major downsides: (i) require numerous user specified rules or scripts to define representation logic of the data for each of the current tasks (i.e., time consuming); (ii) rely on user experience and is not scalable; (iii) select a dataset by random sampling from source data, which does not provide adequate representation for the current task; and (iv) focus solely on the current dataset rather than on the process that consumes the dataset, and as a result, the current tools struggle to provide an optimal result between the smallest possible dataset and the similarity to the source data.

Embodiments of the present invention solve some of the problems stated above by using representative test datasets based on production data from the performance standpoint that are smaller in size to help teams (i.e., users) to increase deployment speed and reduce maintenance costs. Embodiments of the present invention improve the art of big data management by extracting test datasets that are representative of performance.

Embodiments of the present invention improve the performance of a distributed data processing job from the resource usage point of view, while reducing user input. Embodiments of the present invention solves the particular problems stated above by combining the analysis of the distributed data processing job transformations performance and the usage of the source data. More specifically, embodiments of the present invention solves the problems in the current art described above by (i) analyzing the initial job performance of a distributed data processing job using the distributed data processing user interface; (ii) analyzing the source code of the distributed data processing job to limit the amount of user input requirement for the current task, by generating an "impact" score of the functions used; and (iii) performing a combined analysis of both source code and data that identifies bottlenecks of the specific job at hand as well as potential issues for the future (affected by data growth). The result of such analysis, described above, will enable embodiments of the present invention to generate the representative test dataset that outlines resource requirements of the full set in a proportional matter.

Embodiments of the present invention may improve the current art by (i) reducing the cost of development and maintenance, through improved testing efficiency; (ii) reducing the time it takes for solutions to reach the market (i.e., fast test & development cycles); (iii) enabling a reduction in infrastructure and resource cost/requirement (i.e., reducing resource requirements during testing cycle); (iv) identifying the future resource requirements based on expected data growth; (v) dataset derived can be used for functional/acceptance testing purposes as well; and (vi) data driven metrics provides more confidence in the data set which in turn drives confidence of the business outcomes.

Implementation of embodiments of the invention may take a variety of forms, and exemplary implementation details are discussed subsequently with reference to the Figures (i.e., FIG. 1-FIG. 6.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to Figure (FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
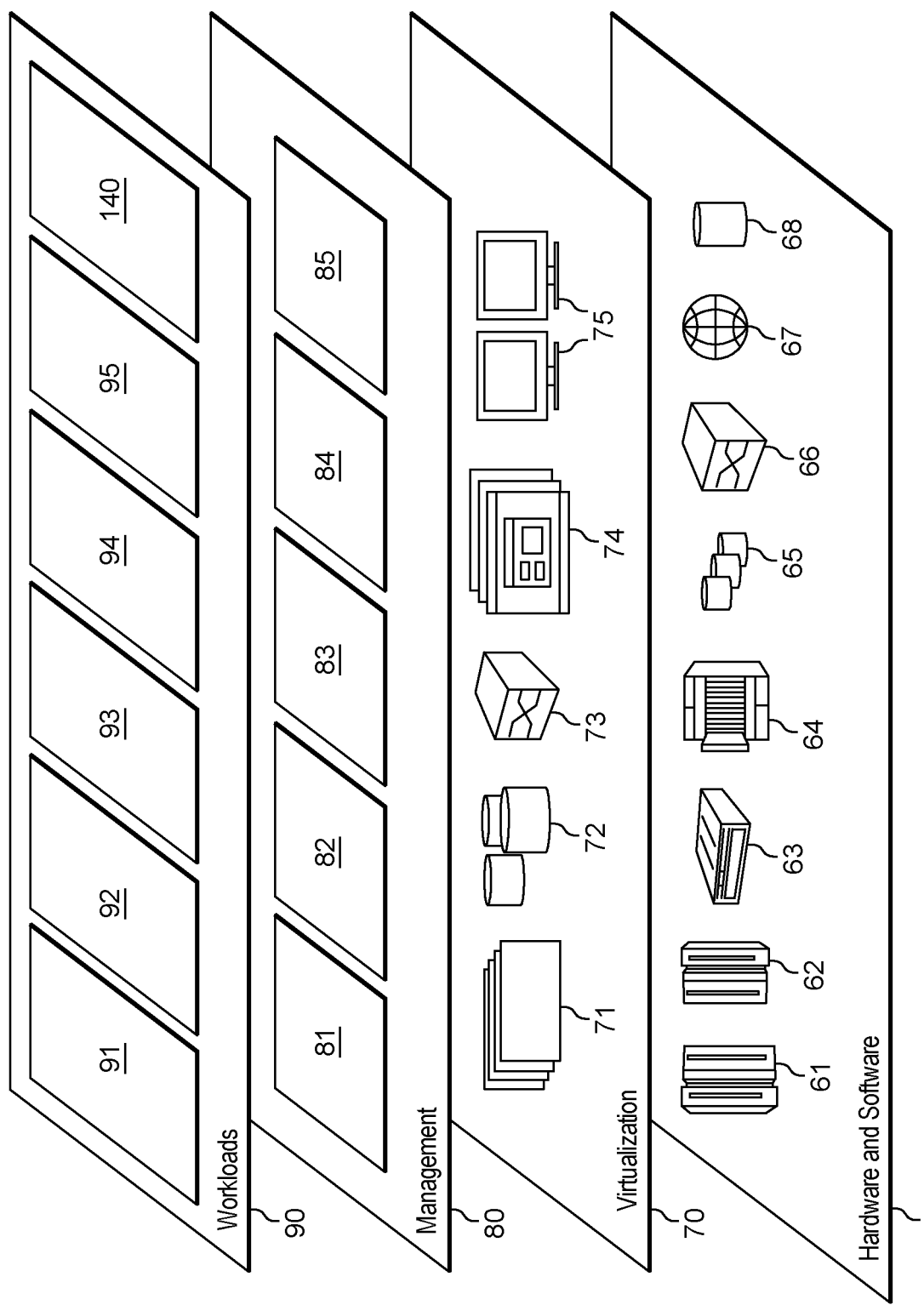
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68".

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and workload orchestrating (orchestrating) component 140.

Figure 3:
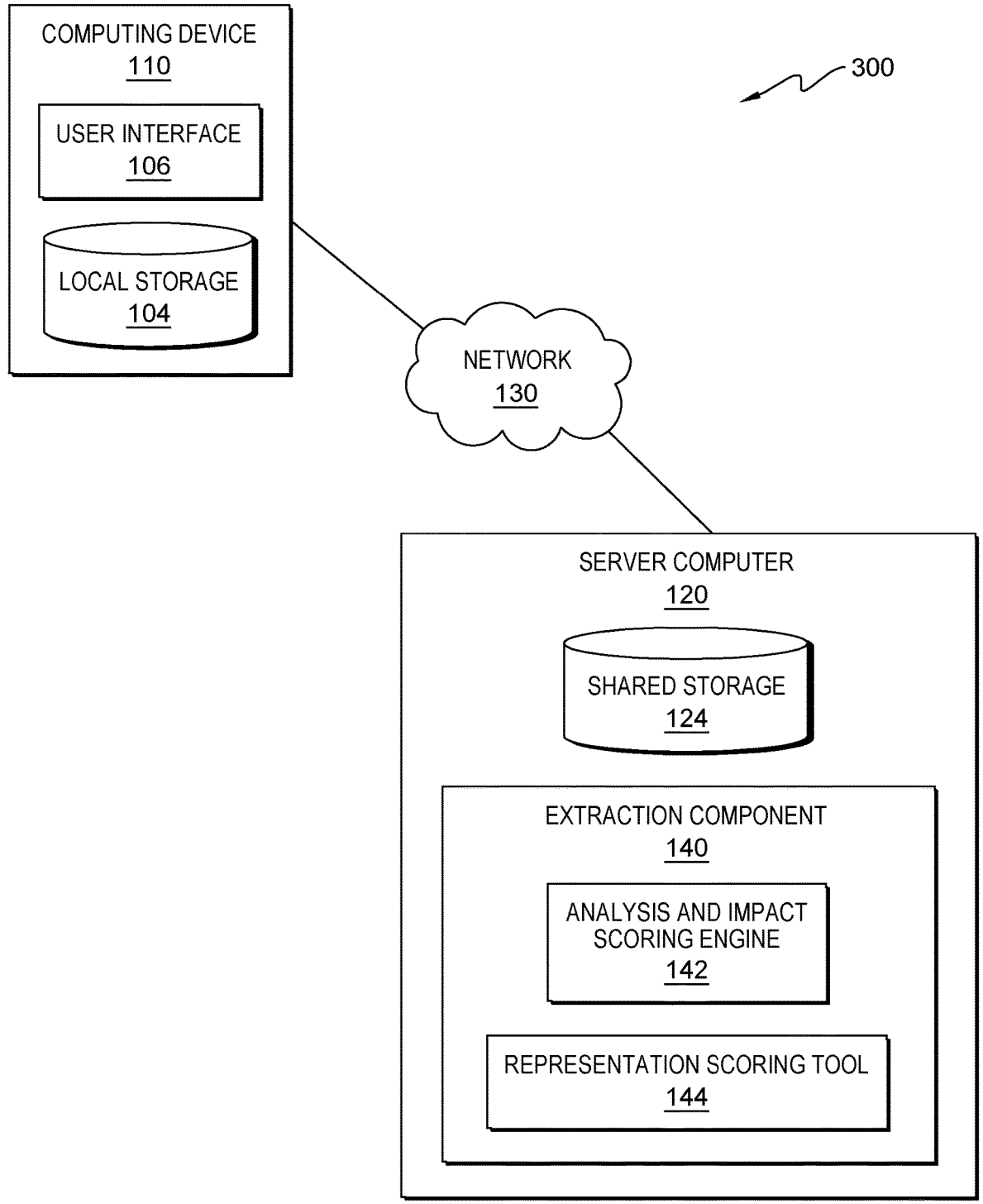
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110, server computer 120, and any other computing devices, server computers, and/or storage devices (not shown in FIG. 3) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments, computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 3, computing device 110 may have a plurality of user interfaces. In other embodiments, not depicted in FIG. 3, distributed data processing environment 100 may comprise a plurality of computing devices, plurality of server computers, and/or one a plurality of networks. Computing device 110 may include internal and external hardware components, as depicted, and described in further detail with respect to FIG. 6.

User interface (interface) 106 provides an interface to the automated feedback and extraction component 140. Computing device 110, via user interface 106, may enable a user and/or a client to interact with extraction component 140 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and/or server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 be a standalone computing device, a management server, a web server, a mobile computing device, one or more client servers, or any other electronic device or computing system capable of receiving, sending, and processing data. In other embodiments, server computer 120 represent a server computing system utilizing multiple computers such as, but not limited to, a server system, such as in a cloud computing environment. In another embodiment, server computer 120 represent a computing system utilizing clustered computers and components (e.g., database server computers, application server computers, etc.) that act as a single pool of seamless resources when accessed within distributed data processing environment 100. Server computer 120 include internal and external hardware components, as depicted, and described in further detail with respect to FIG. 6. In some embodiments of the present invention, server computer 120 represent a plurality of server computers.

Each of shared storage 124 and local storage 104 may be a data/knowledge repository and/or a database that may be written and/or read by one or a combination of extraction component 140, server computer 120, and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110, server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In some embodiments of the present invention, shared storage 124 and/or local storage 104 may each be a hard drive, a memory card, a computer output to laser disc (cold storage), and/or any form of data storage known in the art. In some embodiments, shared storage 124 and/or local storage 104 may each be one or more cloud storage systems and/or databases linked to a cloud network. In various embodiments, shared storage 124 and/or local storage 104 may access, store, and/or house user data, physical room data, and meeting data, and/or data shared throughout distributed data processing environment 100.

In the depicted embodiment, extraction component 140 executes on server computer 120. In other embodiments, extraction component 140 may be executed on computing device 110. In various embodiments of the present invention, not depicted in FIG. 3, extraction component 140 may execute on a plurality of server computers 120 and/or on a plurality of computing devices 110. In some embodiments, extraction component 140 may be located and/or executed anywhere within distributed data processing environment 100 as long as extraction component 140 is connected to and/or communicates with analysis and impact scoring engine 142, representation scoring tool 144, computing device 110, and/or server computer 120, via network 130.

In various embodiments of the present invention, extraction component 140 identifies the performance of a job from the resource usage point of view, while reducing user input. Extraction component 140 may combine the analysis of the distributed data processing job transformation performance and the distributed data processing job's usage of the source data. Extraction component 140 may improve the art of big data management in distributed data processing engines by (i) analyzing the initial job performance of a distributed data processing job using the distributed data processing user interface (e.g., interface 106); (ii) analyzing the source code of the distributed data processing job to limit the amount of user input requirement for the current task, by generating an "impact" score of the functions used; and (iii) performing a combined analysis of both source code and data will help to identify bottlenecks of the current job/task as well as potential issues for the future (affected by data growth). The result of such analysis, described above, will enable embodiments of the present invention to generate the representative test dataset that outlines resource requirements of the full set in a proportional matter.

In the depicted embodiment, analysis and impact scoring engine 142 and representation scoring tool 144 each execute on extracting component 140. In other embodiments, analysis and impact scoring engine 142 and representation scoring tool 144 may each be executed (either individually or together) on computing device 110 and/or server computer 120. In various embodiments of the present invention, not depicted in FIG. 3, analysis and impact scoring engine 142 and representation scoring tool 144 may each be executed (either individually or together) on a plurality of server computers 120 and/or on a plurality of computing devices 110. In some embodiments, analysis and impact scoring engine 142 and representation scoring tool 144 may each be located and/or executed (either individually or together) anywhere within distributed data processing environment 100 as long as analysis and impact scoring engine 142 and representation scoring tool 144 are each connected to and/or communicate with extraction component 140, computing device 110, and/or server computer 120, via network 130.

Figure 4:
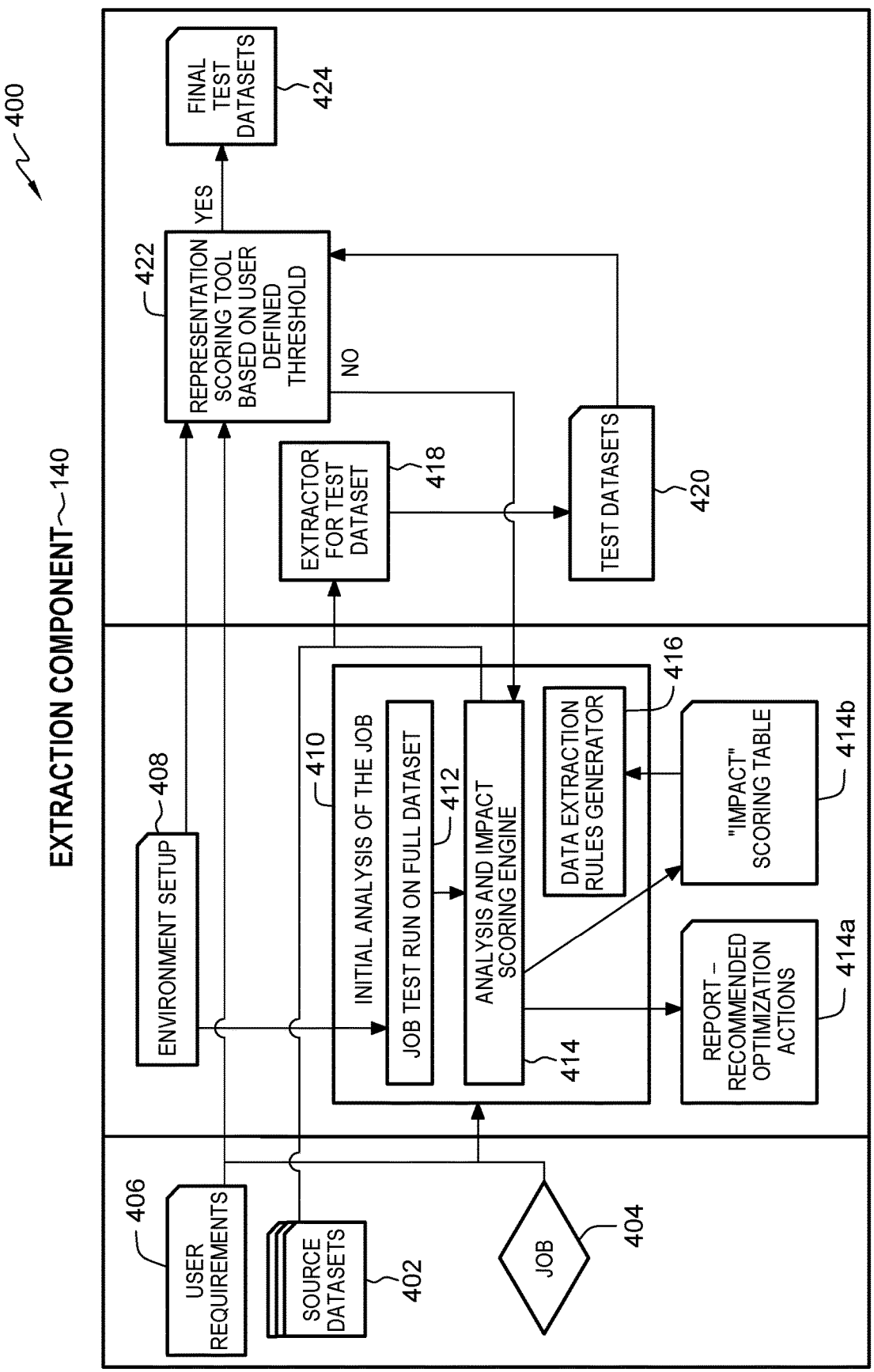
FIG. 4 illustrates operational steps of an extraction component, on a server computer within the distributed data processing environment of FIG. 3, for extracting performance representative test datasets, in accordance with an embodiment of the present invention.

FIG. 4 illustrates operational steps extraction component 140, generally designated 400, in communication with computing device 110 and/or server computer 120, within distributed data processing environment 100 of FIG. 3, for extracting performance representative test datasets, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, extraction component 140 receives input data. In various embodiments of the present invention, extraction component 140 receives or retrieves source datasets used by a job from one or more databases (e.g., local storage 104 and/or shared storage 124), wherein a job is any type of distributed data processing job running on cloud or bare metal servers.

In step 404, extraction component 140 retrieves the distributed data processing job (i.e., job) and its source code. In various embodiments of the present invention, extraction component 140 receives or retrieves the distributed data processing job application itself (e.g., cloud containerized image) and the source code associated with distributed data processing job. In various embodiments of the present invention, extraction component 140 retrieves the distributed data processing job source code from an open source community, directly from the distributed data processing engine, or from a database.

In step 406, extraction component 140 receives the user's requirements. In various embodiments of the present invention, extraction component 140 receives a user's requirements from user input via interface 106 or retrieves previously entered and stored user requirements from shared storage 124 and/or local storage 104, wherein user requirements comprise, but are not limited to, expected data size and/or representativeness percentage, number of iterations for test dataset extractor, and/or run mode (e.g. fast and precise). In some embodiments of the present invention, additional user requirements can be integrated based on "expansion" of the system capabilities and/or setup.

In step 408, extraction component 140 executes code on a given environment setup. In various embodiments of the present invention, extraction component 140 executes code on a given environment setup on a full dataset. In various embodiments of the present invention, extraction component 140 extracts allocated driver memory, number of executors, number of cores per executor and allocated memory per executor from the environment setup to be used in a test run of the full dataset (step 412).

In step 410, extraction component 140 executes the initial analysis of the job. In various embodiments of the present invention, extraction component 140 executes, via analysis and impact scoring engine, the initial analysis of the job. In various embodiments of the present invention, the initial analysis of the job may be a block to consolidate job run time analysis, source code analysis, and source data analysis. In various embodiments of the present invention, after the job is executed on the source dataset the workflow metadata is gathered (such as count of stages and tasks, stage and task duration, shuffle memory, input data size per stage/task, transformation workflow topology, etc.). Additionally, the links between the execution steps and source code may be identified. In various embodiments of the present invention, once the connections between the execution steps and source code are identified and workflow metadata is associated to different blocks of the source code then the combined analysis of source code and data is taking place.

In step 412, extraction component 140 executes a test run of the job. In various embodiments of the present invention, extraction component 140 executes a test run on the full dataset of a job. Extraction component 140 may execute a job test run and identify existing bottlenecks through a run-time monitoring interface (e.g. interface 106). In various embodiments of the present invention, extraction component 140 collects workflow metadata, wherein execution steps are linked to source code and workflow metadata comprises, but is not limited to, stage and task duration, shuffle memory, and transformation workflow topology. Extraction component 140 may use a job run-time monitoring tool, that provides details on the specific run, such as stage and tasks durations, memory, input data size, topology, and/or any other details known in the art. The end results may hold structured metadata and a connection to source code regarding significant transformations, that are further filtered and processed in step 414 to identify bottlenecks in a particular job (i.e., transformations that require more run time and/or resources). In some embodiments of the present invention, extraction component 140 may output end results from that executed test run and display the test results to a user, via interface 106.

In step 414, analysis and impact scoring engine 142 generates an impact scoring table. In various embodiments of the present invention, analysis and impact scoring engine 142, via a source code and data analyzing tool, generates an impact scoring table of the transformations used in step 412. In step 414A, analysis and impact scoring engine 142 generates a recommendation report on potential issues and bottlenecks in an existing job based on the analysis. Analysis and impact scoring engine 142 analyzes the generated logs, probes, and correlates with the source code and provided dataset to identify potential issues and bottlenecks in an existing job. Analysis and impact scoring engine 142 may analyze source code along with various parameters such as: data read and write time, split and execution time, and clean up time at various levels, per distributed data processing job stages and may generate "impact" scores for the transformations used. Computational complexity of transformations is identified and correlated to execution time. In various embodiments of the present invention, known or identified solutions are proposed to correct identified issues and reported to one or more users, via computing device 110, wherein the issued report to the one or more users comprises recommended fixes (i.e., solutions) to the identified issues or potential bottlenecks.

In step 414B, analysis and impact scoring engine 142, via a source code and data analyzing tool, generates an impact scoring table for the transformation used in step 412. In various embodiments of the present invention, analysis and impact scoring engine 142 apply weighted logic to the transformations in order to generate a final impact score for a given transformation. The transformations in the job are divided in groups by the size of the data used and time required for processing to calculate the weights for the "impact" scoring table. In various embodiments of the present invention, if any possible optimizations or bottlenecks were identified, the identified transformations are added to the recommendations report. In various embodiments of the present invention, via analysis and impact scoring engine 142, the recommendations are divided into two groups: (i) performance improvements, for long running jobs; or (ii) potential bottlenecks in a particular job, for transformations that are currently running in relatively short period of time. In various embodiments of the present invention, transformations in the recommendation report may be scored based on the complexity of the transformation and current run duration (e.g., long running jobs are assigned a higher score) by analysis and impact scoring engine 142. Analysis and impact scoring engine 142 may generate and output one or more reports with possible optimizations, along with impact scores to a user, via interface 106. In some embodiments, the one or more reports with possible optimizations, along with impact scores are later consumed by extraction component 140.

In various embodiments of the present invention, analysis and impact scoring engine 142 may divide the transformations into one or more groups. For example, during the calculation of the impact score, analysis and impact scoring engine 142 divides the transformations into four groups (e.g., small data with short duration, small data with long duration, big data with short duration and big data with long duration). Grouping of the transformation may be adjusted during the setup of the system. For example, adding a "Medium" size data category, or grouping transformations by thresholds (e.g. <10 Mb, 10 Mb-20 Mb, 20 Mb-1 Gb, 1 Gb-10 Gb, >10 Gb, etc.). Additionally, in various embodiments of the present invention, duration can be divided into more precise groups (e.g. <5 min, 5 min-20 min, 20 min-3 hrs, 3 hrs-10 hrs, >10 hrs), or third dimension can be applied to the grouping, for example, by the number of tasks in the stage (e.g. 1 task per stage, 1-5 tasks per stage, 5-10 tasks per stage, 10-20 tasks per stage, >20 tasks per stage), to determine the distribution of the stage (the distribution of the stage may be calculated simultaneously by multiple nodes or creates a bottleneck by being calculated on a single node).

In various embodiments of the present invention, different scoring logic may be applied to each group of the transformation. Increasing number of groups to a certain level and applying tailored Equation for each condition can improve the precision of the calculated impact score.

For example, groups are defined by run duration and data size, wherein weighted logic is applied to the groups (e.g., group of transformation). Run duration, taken as overall time per the group of transformation in the same stage. Determining (i.e., defining) if the duration of transformation is "long" analysis and impact scoring engine 142 executes Equation 3, where $T_{Stage}$ represents the duration of the stage that contains the transformation in question, $T_{Total}$ represents the total duration of the job, $C_{Stage}$ represents the total count of stages in the job, and $\sigma$ represents the standard deviation stage run time. Data size is taken in the correlation of available system resources. Analysis and impact scoring engine 142 determines the data size by executing Equation 4, where $S_{StageData}$ represents the size of the data per stage, $C_{Executor}$ represents the count of executors available on the environment, and $M_{Executor}$ represents the executor memory set on the environment.

For example, the identified transformations are added to the impact scoring table where the duration is either long or short and the data size is either small or big. For a small dataset with long duration, the score is calculated based on duration, complexity of transformation and additional score for small data, as shown in Equation 1. For a small dataset with a short duration analysis and impact scoring engine 142 derives the recommendation report from the potential bottlenecks. For big datasets with a long duration the score is calculated based on duration and complexity of the transformation plus the data used and iteration score—additional score for "small" environment (compared to size of transformed data), as shown in Equation 2.

$$F_{Duration} + F_{SmallData} + F_{Transf} \qquad \text{Equation 1:}$$

$$F_{Duration} + F_{Iteration} + F_{DataSize} + F_{Transf} \qquad \text{Equation 2:}$$

In various embodiments of the present invention, analysis and impact scoring engine 142 scores the transformation by applying the weighted logic. Analysis and impact scoring engine 142 may adapt the scoring approach to accommodate specific applications in a system. Analysis and impact scoring engine 142 may score the identified transformations using Equation 5 to score function of transformation duration, Equation 6 to score small data, Equation 7 to score small environments (i.e., an iterations score), Equation 8 as a scoring function to score and determine the size of data used in the transformation, and/or Equation 9 as a scoring table to score transformation complexity. In the equations below, it should be noted that "div" represents integer division. For Equation 9 the "X" represents Table 1.

$$T_{Stage} > \left( \frac{T_{Total}}{C_{Stage}} + \sigma \right) \qquad \text{Equation 3}$$

$$\frac{S_{StageData}}{C_{Executor}} > M_{Executor} \qquad \text{Equation 4}$$

$$F_{Duration} = div\left( \frac{T_{Stage} \times 10}{T_{Total}} \right) \qquad \text{Equation 5}$$

$$F_{SmallData} = div\left( \frac{F_{Duration}}{2} \right) \qquad \text{Equation 6}$$

$$F_{Iteration} = div\left( \frac{S_{ExecData}}{M_{Executor}} \times 0.2 \right), \text{ where } S_{ExecData} = \frac{S_{StageData}}{C_{Executor}} \qquad \text{Equation 7}$$

$$F_{DataSize} = div\left( \frac{\frac{S_{TransfData} \times 10}{S_{StageData}2} - 2}{2} \right) \qquad \text{Equation 8}$$

$$F_{Transf} = \sum X \qquad \text{Equation 9}$$

TABLE 1

| Is Transformation | Yes | No |
|---|---|---|
| Require Shuffle? | 2 | 0 |
| Wide? | 2 | 0 |
| Not Indexed | 2 | 0 |

In step 416, analysis and impact scoring engine 142 generates data extraction rules. In various embodiments of the present invention, analysis and impact scoring engine 142 generates data extraction rules based on the impact scoring table. In various embodiments of the present invention, not all attributes (e.g. the source dataset), are used in transformations and a diversity of those unused attributes is not required to achieve the representativeness from performance point of view. Thus, analysis and impact scoring engine 142 applies the data extraction rules based on the attributes that are specifically used by transformations in the job. As attributes used in transformations will mostly be part of transient data (intermediate data frames generated along the process), analysis and impact scoring engine 142 may generate system requirements, wherein the generated system requirements comprise of tracing the source attributes (e.g., attributes from source dataset) that are used by various transformations. In various embodiments of the present invention, based on source code, functional dependencies for each transient attribute are traced back to source attributes and the requirements on determinants (e.g., source attributes) are defined and consolidated in the rules by analysis and impact scoring engine 142. The equations and calculations logic stated above are provided simply as one example and one particular embodiment that can be adjusted per user need and systems specific application needs.

In various embodiments of the present invention, generated rules consist of determinants' required partitioning logic, variations of value pairs, diversity and distribution of partitions and requirements for the transformations. The rules may be separated by source tables and have scores correlated to the "impact" score table to provide extraction (highest scored) requirements and additional ones, that will be used for evaluation by analysis and impact scoring engine 142. If no rules are identified for specific source data then analysis and impact scoring engine 142 may use random extraction to extract the representative data. In various embodiments of the present invention, the rules enable a predetermined deviation assignment. For example, the default value of the deviation is set to 20%. To achieve the accuracy and/or size requirements provided by user, deviation percentage (%) is adjusted during additional iterations. In this particular example, the rules with currently set deviation percentage and score are output to step 418 for extraction of the data. During each iteration the deviation may be corrected and updated based on the rule set provided in step 418. The predetermined deviation may be adjusted between iterations based on the run mode set by the user in step 406 (e.g., "fast" mode implies less iterations for fast results, through higher percentage change, or "precise" mode that means more iterations for more precise results).

In step 418, extraction component 140 extracts and outputs test datasets. In various embodiments of the present invention, extraction component 140 extracts one or more test datasets from the source data based on the generated rules in step 418. In various embodiments of the present invention, extraction component 140 uses source data clustering on transient partitioning membership to extract a plurality of test datasets. Rules are provided for identified priority groups based on the calculated and generated impact score. The rules may determine a transformation. With rules ordered by the score, each rules' definition of partitioning logic is projected onto rows in source dataset to calculate for any given row and transformation of one or more the exact Partition Identifier (PI). In various embodiments of the present invention, randomly sampled partitions get an identifier of "0". That way, any PI is deterministic. In various embodiments of the present invention, combining the PIs for a given Row (R) in order of rules' score creates a Source Partition Identifier (SPI) bound to R.

For example, a row has an SPI of (1,4,7), meaning row contributed to partition 1 in 1st rule, partition 4 in 2nd rule, and partition 7 in the 3rd rule. In various embodiments of the present invention, rows with common SPI will be members of a Cluster in Source dataset (SC), and partitions that are too small to be sampled are grouped together. For example, a user wants to extract 20% of the data, so it's representative. In this example, extraction component 140 extracts 20% random sample of each SC, meaning partitions in each transformation are also 20% sampled. Proof: SUM(all x, all y, z, 0.2*Size_of_Partition(x, y, z))=0.2*SUM(all x, all y, z, Size_of_Partition(x, y, z))=0.2*Size_of_transient_partition_defined_by_rule(z). Partitions are Created based on query results (i.e. Group By clause) and further divided into Randomized Sub-partitions may occur, if a partition is still too big.

Extraction component 140 may apply extraction rules to determine SPI for each row. In various embodiments of the present invention, extraction component 140 uses SPI to establish clustering. Extraction component 140 may sample desired random predetermined percentages of each SC. Extraction component 140 may provide sampled datasets to step 420. The random sampling enables extraction component 140 to identify if the evaluation fails, wherein the next random step can yield different results. Extraction component 140 In various embodiments of the present invention, based on the rules identified in step 416, one or more partitions and sub-partitions are sampled. In various embodiments of the present invention, deterministic partitions are made small and spark-native partitions drop in count of partitions. In various embodiments of the present invention, subsequent intermediate segment sizes are either directly in relation to previous segmentations or are not affected. Extraction component 140 may send and/or provide the proposed test datasets to a representation scoring process tool (scoring tool) 144.

In step 420, representation scoring tool 144 scores the test dataset representativeness. In various embodiments, extraction component 140, via representation scoring tool 144, scores the test dataset representativeness in percentage and will validate the test dataset representativeness against the initial user's requirements established in step 406. In the depicted embodiment, if representative scoring tool 144 determines the user requirements are not met (No step) then extraction component 140 returns to step 416 where additional requirements may be provided by the user. In various embodiments of the present invention, the process is interrupted if threshold is met, amount of iteration exceeds the user limit, and/or the iteration process is manually paused/stopped by the user. In the depicted embodiment, if representative scoring tool 144 determines the user requirements are met (Yes step), then extraction component 140, via representation scoring tool, proceeds to step 422.

In step 422, extraction component 140 scores the representativeness of the test datasets. In various embodiments of the present invention, extraction component 140, via a representation scoring tool, scores the representativeness of the test datasets based on the user defined thresholds. In some embodiments, the user defined thresholds are predetermined. In various embodiments of the present invention, there are several parameters, that are validated; however, the number of jobs and stages per job remain constant. Jobs are defined by actions (e.g., a distributed data processing engine uses lazy evaluation), stages are influenced by shuffle and so the count should remain constant. Based on the changes of count and duration of tasks the representation score may be calculated. Task is the main parameter that can be used to determine the degree of representation. With the same transformations and actions as well as environmental setup (executors' number/cores/memory), the only thing that affects the speed of the process is partitioning of data as it affects the parallelism. If the test dataset has the same partitioning logic then the test dataset fully represents the source data from a performance point of view. Depending on the partitioning logic used in the stage (e.g., a predetermined stage) with the reduction of source data either count of tasks will be reduced affecting total run time of the stage or the count of tasks will remain the same with records per task reduced affecting run time per task. Based on this behavior, representation level can be defined by the correlation in the partitioning (partitioning of the simple/small transformations can be ignored, as it can only take less time for processing after reduction of the data).

Based on the distributed data processing engine logic, count of tasks and run time per task can be estimated for the x-time reduction of the records. Based on divergence from expected result representativeness is measured in percentage (%). Representativeness score and dataset size (%) are provided to the user. All intermediate datasets are stored, until the dataset generation job is discontinued by the user. If user requirements are met or maximum amount of iterations reached, wherein the maximum amount of iterations is predetermined, the process will pause, otherwise extraction component 140 will return to step 416 for another iteration on an updated deviation. In the depicted embodiment, steps 416 and step 422 are repeated until one or more predetermined conditions occur. In various embodiments of the present invention, all intermediate datasets are stored and accessible until the run is marked as complete by a user.

In step 424, extraction component 140 executes a final test of the datasets. In various embodiments of the present invention, extraction component 140, representative scoring tool 144 tests one or more of the identified and scored datasets. In various embodiments of the present invention, after each iteration, the size and representativeness of the created dataset is provided to user and store in a log on local storage 104 and/or shared storage 124. In various embodiments of the present invention, scoring tool 144 receives and/or retrieves the intermediate dataset extracted in step 418, environmental setup, user requirements for representativeness level (percentage (%)), and/or subset size (% of source data). Test run of the job may be performed based on the intermediate dataset. Using run-time monitoring interface (e.g. interface 106 to access user interface of distributed data processing engine) enables access to the runtime performance parameters for comparison with original run to perform representation scoring.

Figure 5:
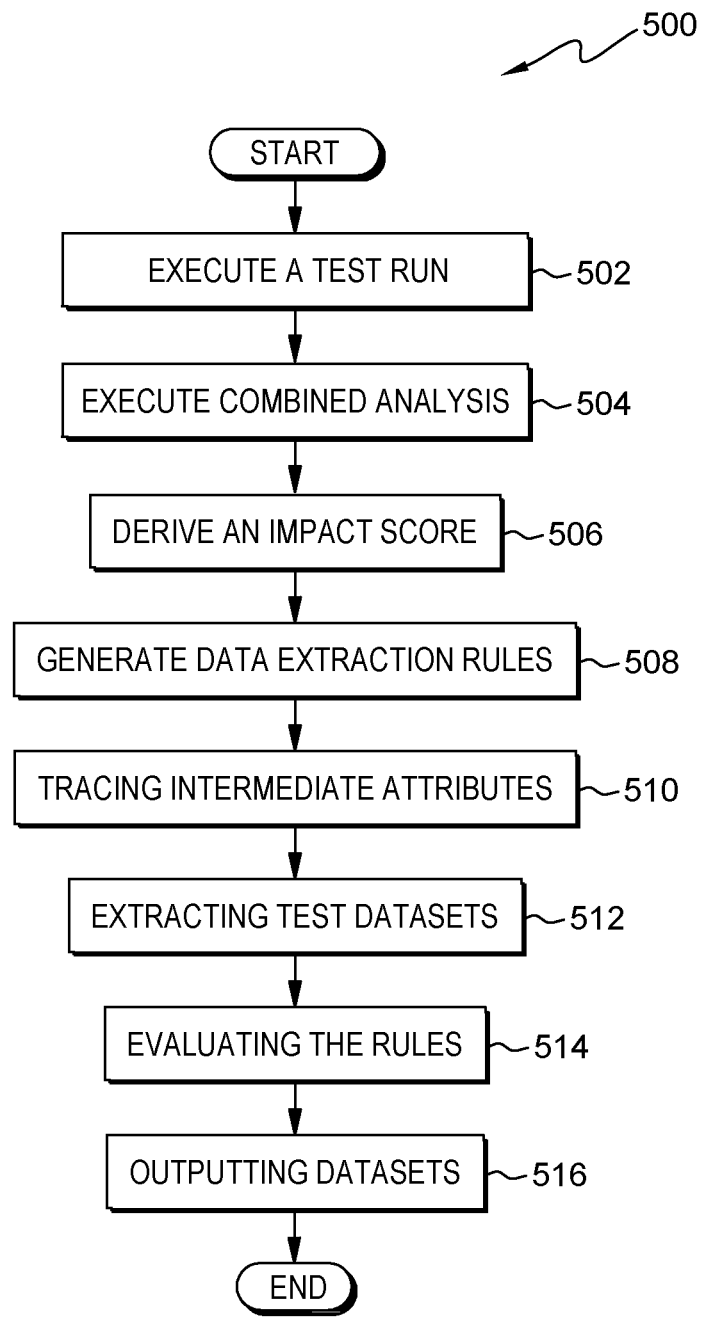
FIG. 5 illustrates operational steps of the extraction component, on the server computer within the distributed data processing environment of FIG. 3, for extracting test datasets from the source code, in accordance with an embodiment of the present invention.

FIG. 5 illustrates operational steps of extraction component 140, generally designated 500, in communication with computing device 110, within distributed data processing environment 100 of FIG. 3, for using an automated tool for extracting test datasets from the source code that correlates in performance with source data for a given job and requires minimal user intervention, to be used for testing and resource optimization tasks, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502, extraction component 140 executes a test run of a job. In various embodiments of the present invention, extraction component 140 executes a test run on the full dataset of a job. Extraction component 140 may execute a job test run and identify existing bottlenecks in a particular job through a run-time monitoring interface (e.g. interface 106). A test run of a job may be performed based on the intermediate dataset. Using run-time monitoring interface (e.g. interface 106 to access user interface of distributed data processing engine) enables access to the runtime performance parameters for comparison with original run to perform representation scoring.

In step 504, extraction component 140 analyzes distributed data processing job. In various embodiments of the present invention, extraction component 140, via an automated analysis tool, executes a run-time metrics analysis, a source code analysis, and source data impact analysis (i.e., combined analysis) of the distributed data processing engine executing a distributed data processing job. In some embodiments of the present invention, extraction component 140 may be executed simultaneously. In various embodiments of the present invention, extraction component 140, via an automated analysis tool, can freely flow analysis execution between the run-time metrics analysis, the source code analysis, and the source data impact analysis based on predetermined or pre-selected logic flow and/or availability of data during analysis.

In step 506, extraction component 140 derives an impact score. In various embodiments of the present invention, extraction component 140 derives the impact score based on the source code along with various parameters (e.g., data read and write time, split and execution time per distributed data processing job stages). In some embodiments of the present invention, the various parameters that are used to derive an impact score are predetermined parameters.

In step 508, extraction component 140 generates data extraction rules. In various embodiments of the present invention, extraction component 140 generates data extraction rules based on the derived impact score.

In step 510, extraction component 140 traces intermediate attributes. In various embodiments of the present invention, extraction component 140 trace intermediate attributes to the source data.

In step 512, extraction component 140 extracts test datasets. In various embodiments of the present invention, extraction component 140 extracting test datasets based on the prioritized groups and extraction rules.

In step 514, extraction component 140 evaluates the rules. In various embodiments of the present invention, extraction component 140, via analysis and impact scoring engine 142, evaluates the rules against the user defined thresholds and prepares the representative test data.

In step 516, extraction component 140 outputs the representative test datasets. In various embodiment of the present invention, extraction component 140 outputs the representative test datasets to a user via interface 106. In various embodiments of the present invention, extraction component 140 can provide step by step guidance to a user detailing optimization techniques associated with the outputted representative test datasets.

Figure 6:
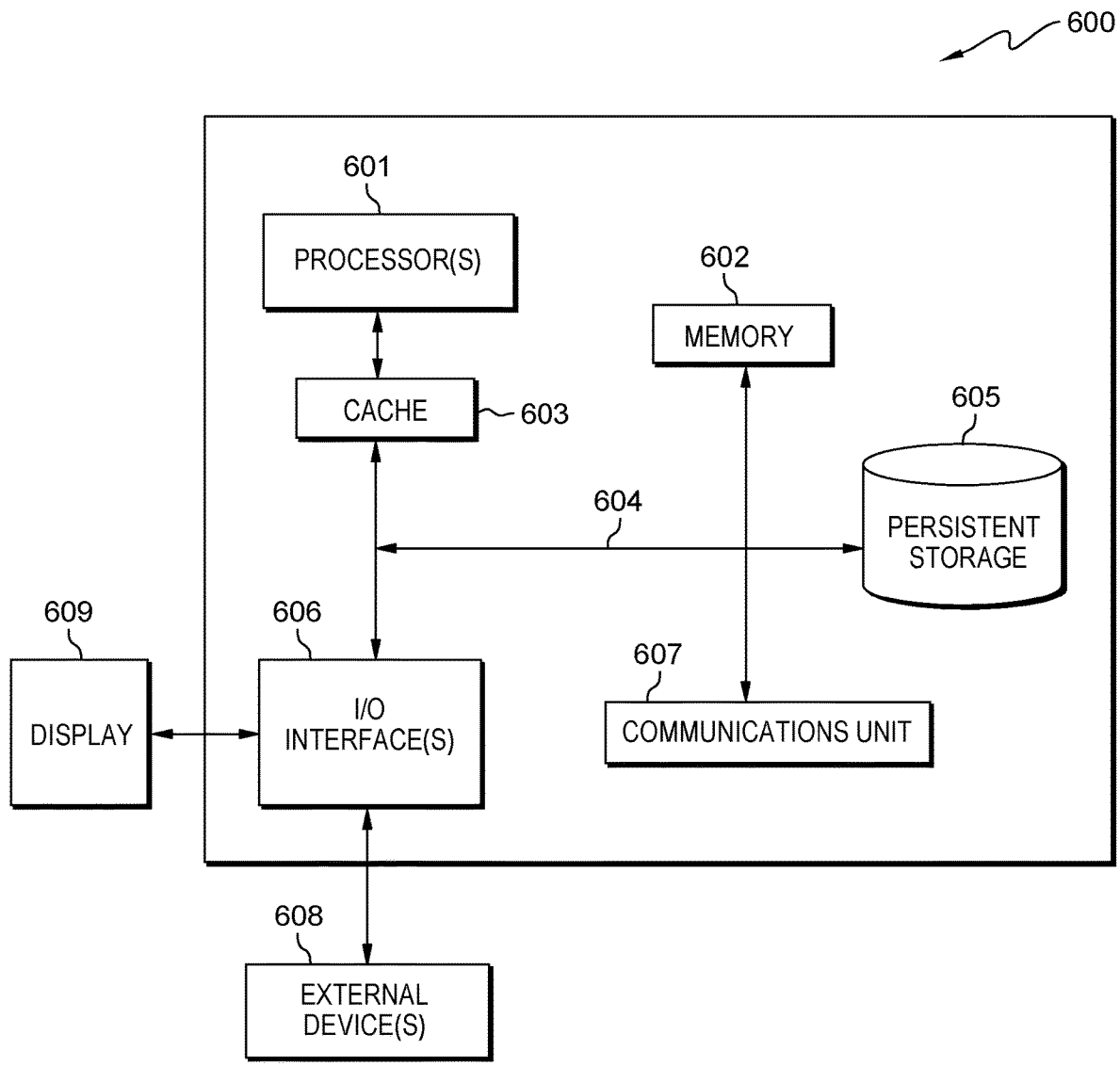
FIG. 6 depicts a block diagram of components of the server computer executing the automated feedback and continuous learning component within the distributed data processing environment of FIG. 3, in accordance with an embodiment of the present invention.

FIG. 6 depicts a block diagram of components of server computer 120 within distributed data processing environment 100 of FIG. 3, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 depicts computer system 600, where server computer 120 represents an example of computer system 600 that includes extraction component 140. The computer system includes processors 601, cache 603, memory 602, persistent storage 605, communications unit 607, input/output (I/O) interface(s) 606, display 609, external device(s) 608 and communications fabric 604. Communications fabric 604 provides communications between cache 603, memory 602, persistent storage 605, communications unit 607, and input/output (I/O) interface(s) 606. Communications fabric 604 may be implemented with any architecture designed for passing data and/or control information between processors (such as microprocessors, communications, and network processors, etc.), system memory, peripheral devices, and any other hardware components within a system. For example, communications fabric 604 may be implemented with one or more buses or a crossbar switch.

Memory 602 and persistent storage 605 are computer readable storage media. In this embodiment, memory 602 includes random access memory (RAM). In general, memory 602 may include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention may be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 enables for input and output of data with other devices that may be connected to each computer system. For example, I/O interface 606 may provide a connection to external devices 608 such as a keyboard, keypad, a touch screen, and/or some other suitable input device. External devices 608 may also include portable computer readable storage media such as, for example, thumb drives, portable optical or magnetic disks, and memory cards. Software and data used to practice embodiments of the present invention may be stored on such portable computer readable storage media and may be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for extracting test datasets for testing and resource optimization, the method comprising:
    executing a test run on a full dataset of a job;
    generating, by an analysis and impact scoring engine, an impact scoring table of job transformations based on a source code analysis;
    generating data extraction rules based on the impact scoring table;
    extracting a test dataset based on the data extraction rules;
    evaluating the data extraction rules against user defined thresholds, and preparing a representative test dataset; and
    outputting, via a user interface on a computing device, the representative test dataset to a user.

2. The method of claim 1, further comprising:
    identifying existing bottlenecks in the job through a run-time monitoring interface.

3. The method of claim 1, further comprising:
    generating, by the analysis and impact scoring engine, a recommendation report on potential issues and bottlenecks based on a run-time metrics analysis, a source code analysis, and a source data impact analysis; and
    identifying connections between execution steps and source code, and associating
    workflow metadata to different blocks of the source code.

4. The method of claim 1, further comprising:
    retrieving source datasets used by the job from one or more databases, wherein the job is any type of distributed data processing job running on one or more cloud or bare metal servers; and
    retrieving a distributed data processing job application, and source code associated with the job.

5. The method of claim 1, further comprising:
    receiving, by the user interface, requirements of a user, wherein the requirements comprise: expected data size and representativeness percentage, number of iterations for test dataset extractor, and run mode; and
    retrieving previously entered and stored user requirements from one or more databases.

6. The method of claim 1, further comprising:
extracting allocated driver memory, number of executors, number of cores per executor, and allocated memory per executor from an environment setup to be used in a test run of the full dataset of the job; and
performing, by a run-time monitoring interface, representation scoring by; comparing runtime performance parameters of the job with runtime performance parameters of an original run of the job.

7. The method of claim 1, further comprising:
executing, by an automated analysis tool, a source code analysis of a distributed data processing engine executing a distributed data processing job.

8. A computer system for extracting test datasets for testing and resource optimization, the computer system comprising:
one or more computer processors;
one or more computer readable storage devices;
program instructions stored on the one or more computer readable storage devices for execution by at least one of the one or more computer processors, the stored program instructions comprising:
program instructions to execute a test run on a full dataset of a job;
program instructions to generate, by an analysis and impact scoring engine, an impact scoring table of job transformations based on a source code analysis;
program instructions to generate data extraction rules based on the impact scoring table;
program instructions to extract a test dataset based on the data extraction rules;
program instructions to evaluate the data extraction rules against user defined thresholds, and prepare a representative test dataset; and
program instructions to output, via a user interface on a computing device, the representative test dataset to a user.

9. The computer system of claim 8, further comprising:
program instructions to identify existing bottlenecks in the job through a run-time monitoring interface.

10. The computer system of claim 8, further comprising:
program instructions to generate, by the analysis and impact scoring engine, a recommendation report on potential issues and bottlenecks based on a run-time metrics analysis, a source code analysis, and a source data impact analysis; and
program instructions to identify connections between execution steps and source code, and associate workflow metadata to different blocks of the source code.

11. The computer system of claim 8, further comprising:
program instructions to retrieve source datasets used by the job from one or more databases, wherein the job is any type of distributed data processing job running on one or more cloud or bare metal servers; and
program instructions to retrieve a distributed data processing job application, and source code associated with the job.

12. The computer system of claim 8, further comprising:
program instructions to receive, by the user interface, requirements of a user, wherein the requirements comprise: expected data size and representativeness percentage, number of iterations for test dataset extractor, and run mode;
program instructions to retrieve previously entered and stored user requirements from one or more databases; and
program instructions to extract allocated driver memory, number of executors, number of cores per executor, and allocated memory per executor from an environment setup to be used in a test run of the full dataset of the job.

13. The computer system of claim 8, further comprising:
program instructions to execute, by an automated analysis tool, a source code analysis of a distributed data processing engine executing a distributed data processing job.

14. The computer system of claim 8, further comprising:
program instructions to perform, by a run-time monitoring interface, representation scoring; and
program instructions to compare runtime performance parameters of the job with runtime performance parameters of an original run of the job.

15. A computer program product for extracting test datasets for testing and resource optimization, the computer program product comprising:
one or more computer readable storage devices and program instructions stored on the one or more computer readable storage devices, the stored program instructions comprising:
program instructions to execute a test run on a full dataset of a job;
program instructions to generate, by an analysis and impact scoring engine, an impact scoring table of job transformations based on a source code analysis;
program instructions to generate data extraction rules based on the impact scoring table;
program instructions to extract a test dataset based on the data extraction rules;
program instructions to evaluate the data extraction rules against user defined thresholds, and preparing a representative test dataset; and
program instructions to output, via a user interface on a computing device, the representative test dataset to a user.

16. The computer program product of claim 15, further comprising:
program instructions to identify existing bottlenecks in the job through a run-time monitoring interface; and
program instructions to extract allocated driver memory, number of executors, number of cores per executor, and allocated memory per executor from an environment setup to be used in a test run of the full dataset of the job.

17. The computer program product of claim 15, further comprising:
program instructions to execute, by an automated analysis tool, a run-time metrics analysis, a source code analysis, and a source data impact analysis of a distributed data processing engine executing a distributed data processing job.

18. The computer program product of claim 15, further comprising:
program instructions to generate, by the analysis and impact scoring engine, a recommendation report on potential issues and bottlenecks based on a run-time metrics analysis, a source code analysis, and a source data impact analysis; and
program instructions to identify connections between execution steps and source code, and associate workflow metadata to different blocks of the source code.

19. The computer program product of claim 15, further comprising:
- program instructions to retrieve source datasets used by the job from one or more databases, wherein the job is any type of distributed data processing job running on one or more cloud or bare metal servers; and
- program instructions to retrieve a distributed data processing job application, and source code associated with the job.

20. The computer program product of claim 15, further comprising:
- program instructions to receive, by the user interface, requirements of a user, wherein the requirements comprise: expected data size and representativeness percentage, number of iterations for test dataset extractor, and run mode; and
- program instructions to retrieve previously entered and stored user requirements from one or more databases.

\* \* \* \* \*